United States Patent [19]

Smith, Jr. et al.

[11] Patent Number: 5,761,510
[45] Date of Patent: Jun. 2, 1998

[54] METHOD FOR ERROR IDENTIFICATION IN A PROGRAM INTERFACE

[75] Inventors: Ross F. Smith, Jr., Redmond; James Perry Rodrigues, Kirkland, both of Wash.

[73] Assignee: Microsoft Corporation, Redmond, Wash.

[21] Appl. No.: 551,778

[22] Filed: Nov. 7, 1995

[51] Int. Cl.$^6$ .................................................. G06F 9/44
[52] U.S. Cl. .................................. 395/704; 395/685
[58] Field of Search ............................. 395/704, 701, 395/705, 710, 685

[56] References Cited

U.S. PATENT DOCUMENTS

| | | | |
|---|---|---|---|
| 4,819,233 | 4/1989 | Delucia et al. | 395/704 |
| 5,255,385 | 10/1993 | Kikuchi | 395/704 |
| 5,313,616 | 5/1994 | Cline et al. | 395/704 |
| 5,361,351 | 11/1994 | Lenkov et al. | 395/704 |
| 5,432,795 | 7/1995 | Robinson | 395/704 |
| 5,495,571 | 2/1996 | Corrie, Jr. et al. | 395/704 |
| 5,590,330 | 12/1996 | Coskun et al. | 395/704 |
| 5,655,121 | 8/1997 | Delagi et al. | 395/704 |

*Primary Examiner*—Kevin A. Kriess
*Attorney, Agent, or Firm*—Jones & Askew, LLP

[57] ABSTRACT

A method for identifying errors in program functions in a program interface found in a header file for the program interface and for identifying errors in program functions in a program interface found in an internal header file and a related public declaration header file for the program interface is provided. In the preferred embodiment, a header file is parsed, and parsing errors are recorded. A test application designed to call each program function in a dynamic link library is generated using information obtained through parsing. The test application is compiled, and compilation errors are recorded. The test application is executed, and errors identified through execution are recorded.

18 Claims, 8 Drawing Sheets

ERROR TABLE

| | Parsing | Compiling/Linking | Execution |
|---|---|---|---|
| Missing implicit "this" pointer | X | | X |
| Missing variable names in either public declaration or internal header file (warning, not error) | X | | |
| Incorrect syntax error in either public declaration or internal header file | | X | |
| Non-virtual table syntax differences between public declaration and internal header files | | X | |
| Incompatibility between public declaration and internal header files caused by: <br> 1. virtual table mismatch caused by interface methods being missing. <br> 2. virtual table mismatch caused by interface methods out of correct order. <br> 3. virtual table mismatch caused by interface methods containing incorrect number of parameters <br> 4. virtual table mismatch caused by interface methods containing parameters out of correct order. <br> 5. virtual table mismatch caused by interface methods containing different parameter types. | | | X |

FIGURE 8

METHOD FOR ERROR IDENTIFICATION IN A PROGRAM INTERFACE

TECHNICAL FIELD

The present invention relates gene rally to a method for error identification in program interfaces and more particularly to a method for error identification in program functions in program interfaces by parsing a header file and using, the information obtained by parsing to create a test program which is compiled and executed and which will identify and record any error found in the header file or files parsed.

BACKGROUND OF THE INVENTION

Writing a large computer application or other program is a complex process which often involves the coordination of many programmers working, concurrently. To avoid repeated program coding, effort each time a particular program function is required, most programming languages utilize libraries of program functions. Libraries of program functions include collections of coded program functions which are sections of code that can be invoked within an application or other program by referencing an identifier for the library program function. Therefore, in constructing a large computer application program, program functions that are used frequently can be stored in a library so that each programmer has access to the program function. Thus, a program function can be coded once and can be used many times by many different programmers for writing a number of applications or other programs. Furthermore, when a change is needed in the internal operation of a library program function that is part of a larger application program, the change is made in only the library program function (i.e., one location) rather than making the change at every occurrence of the program function within the larger application program.

Programmers make use of the library program functions by incorporating them into their application or other programs. If a library program function is used in an application program, the code for the library program function is found in the library, and the coded library program function is statically or dynamically linked to the application program at link time. To work properly, however, the application program needs information from the library about the library program function's declaration, such as the program function identifier and return type. In some programming languages like C and C++, the information regarding the program function's declaration is accessed by including in the application program the appropriate header file for the requested library program function. A header file for the library program function contains the definitions of data types and variables used by a grouping of the program functions in a library.

Additionally, application programs typically must be able to operate in a predetermined environment. For example, a programmer may want to develop an application program that will run in the Microsoft "WINDOWS" operating system. This is made easier by the availability of application program interfaces (APIs). APIs are a published method (interface) through which a calling program can access and execute reusable code that lies in a Dynamic Link Library or executable application.

Before a library, DLL, or an API (collectively program interfaces) is released to developers as part of a developers kit, the program interface must be tested to ensure that the library program functions in the program interface operate as designed. This will ensure that when a program function in a program interface is correctly called from an application or other program, the program function is accessible and will perform as it was designed to perform.

Testing of program interfaces is also required because public declaration header files for the program interfaces that are publicly available to software developers may differ from the internal header files that were actually used during the development of the program interfaces. Otherwise a difference can escape detection and end up in the shipped product i.e. a software developer's kit (SDK) which includes the public declaration header files and the shipping DLL. Internal header files refer to the header files maintained by the developer of the program function or library of program functions as compared to the client developers who use the program function or library of program functions to develop application programs. The difference between internal header files and public declaration header files results from the need to declare information in the internal header files that should not be exposed to the user of the program interface (the client developer). As an example, proprietary, remnant, or debugging code may be present in the internal header file that is not used by the program interface user (the client developer). This is a common practice and increases the likelihood of errors and inconsistencies between public declaration header files and internal header files. Because the developer is required to maintain two sets of headers, the process is prone to human error, resulting in the two headers becoming dissimilar. As the complexity and volume of program interfaces increase, errors of this type are more common.

In the past most program interfaces were written in the C programming language. With the C programming language, much of the testing of the program interfaces could be done inherently in the application program development process because, at the time, application programs were also written in C. For example, if a programmer identifies a need for a program function that will be frequently used, he typically will include the program function in a program interface. However, in most cases before the program interface containing the program function is publicly released, the program function will generally be called by an application program also written in C that needs to perform that program function. Therefore, in the past, it was usually determined before the public declaration header file was made publicly available that a proper C program call to that program function would work properly.

By contrast, today many program interfaces are written in the C++ programming language. C++ is an object-oriented programming language. In an object-oriented programming language, a program is viewed as a collection of self-contained objects which can interact with other objects. The C++ programming language provides for data encapsulation, which is the enclosure of program functions and other data into self-contained objects, and for data type inheritance, which is the ability to define a data type in terms of other data types. In C++ the term class refers to the above mentioned types of self-contained objects. Object-oriented programming facilitates the development of large computer application programs that require reusable and modular components. Although many programmers have begun using the C++ programming language to write their programs because of its benefits, other programmers have not. This has resulted in the need for new types of testing of program interfaces, in addition to what was already needed as mentioned above. Because application programs are being written in languages other than C++, the program interfaces must now be tested to make sure that the program functions can be accessed properly when the program functions are called from application programs written in these other languages in addition to the C++ programming language. This adds to the type of errors that can be made when writing a program function in a program interface.

An application program written in C can call program functions in a program interface written in C++, but because of differences in the two languages, the program function must be written in such a way that the C application program can properly access the C++ virtual table. A virtual table is created by the C++ compiler, and it contains the memory address of each program function in a class. Upon execution, pointers called "this" pointers are initialized to point to each virtual table associated with each class. In this way, member program functions can be accessed. Though this is done implicitly in C++, it is not in C. For a C program to gain access to the virtual table created in C++, the program function must include the "this" pointer in its declaration. If this is not done, an application program written in C would not be able to locate the memory addresses of the program functions in the class, and as a result, those program functions of the program interface would not be accessible.

Currently, testing of program interfaces is done by visually inspecting code and manually writing, compiling, and executing a program to call each of the program functions in the program interface to verify that each program function can be called correctly. If the program function cannot be called correctly, that failure is noted so that changes can be made and. Furthermore, test programs have to be written in more than one language, for example C, C++, and BASIC, so that testing can be done to ensure programs written in each of these languages can properly access the program functions. Also, the public declaration header files must be compared by visual inspection with the internal header files to ensure that they are the same.

This process of visually inspecting code and manually testing the program interfaces is time consuming and prone to error. Ideally these manually written programs need to be updated, compiled, and executed with each update of the DLL and corresponding headers. Because of the increasingly large number of program functions and program interfaces, this has become an extremely time consuming process. Furthermore, this manual process is prone to human error which is unacceptable for software products that are publicly distributed. The manual process requires constant and significant maintenance and can rapidly become too much for one person to manage. Because of the complex nature of the manual testing process, the result is that flawed program interfaces may be made publicly available through the release of public declaration header files.

To overcome the problems associated with the current method of assuring accuracy of program functions in program interfaces, it would be desirable to provide a method for creating a test application that will identify any errors existing in a header file without human intervention. The method should allow a user to simply input header file information and have the test application identify and record all errors that are found. There is a further need for a method to ensure that a C application program can correctly access the virtual table for a C++ program function in a program interface called in the application program. There is a further need for a method to ensure that an internal header file and a public declaration header file do not become dissimilar.

SUMMARY OF THE INVENTION

In recognition of the problems of prior manual testing processes, the present invention provides a method for the identification of errors in program functions of program interfaces without substantial user intervention. Particularly, the method of the present invention permits efficient identification of errors found in header files. The method of the present invention automatically generates a test application that will identify and record any errors found in a header file. The test program can exist in a number of languages and is usable under any computer architecture that can support the target languages and calling conventions. By testing for errors in program functions in program interfaces, the method assures that properly written calls for program functions will execute properly. For example, a properly written call in C for a program function written in C++ will be able to generate the "this" pointer and thereby access the virtual table of addresses for the program functions.

In accordance with the preferred embodiment of the present invention, the method identifies errors in program functions in a program interface resulting from errors in header files. The method begins by parsing a header file. Using information obtained by parsing the public header declaration file, the method creates a test program which is compiled and executed. The method identifies any errors discovered in the process of parsing the header file, compiling the test program, and executing the test program.

More particularly with respect to parsing, the method of the present invention obtains information about each program function's identifier and declaration information and stores the information in an interface object list. The method then uses the interface object list to create a test application. The test application is generated to make program function calls for each program function found in the header file for the program functions in the program interface to ensure that each program function can be called and executed properly. The test application is compiled, and compiling errors are identified. Compiling errors can occur due to a variety of causes such as missing implicit "this" pointers or incorrect header declarations. The compiled code is then linked into an executable test program. Next the test application is executed. The test application makes program function calls for each of the program functions in the header file, and if the call does not execute properly, the error that occurs as a result of the program function call is identified.

More particularly with respect to parsing of the internal header file, the method obtains program function identifier and declaration information about each program function in the internal header file and stores that information in an interface object list. During parsing of the internal header file, syntax errors that may exist in the internal header file are identified.

It is therefore an object of the present invention to identify errors in program functions in program interfaces without substantial user intervention.

It is a related object of the present invention to identify errors that exist in a header file.

It is a further object of the present invention to ensure that the virtual table of addresses for the program functions can be accessed correctly.

It is a further object of the present invention to provide a method to identify dissimilarities between an internal header file and a public declaration header file.

It is a further object of the present invention to automatically create a test application that will identify any errors in a header file.

It is a further object of the present invention to create a test application in a variety of programming languages.

It is a further object of the present invention to create a test application available to a multitude of compilers.

That the present invention accomplishes these objects and offers the above-described advantages will be apparent to those skilled in the art from the following description, the appended claims, and the accompanying drawings.

BRIEF DESCRIPTION OF THE DRAWINGS

FIG. 8 is an Error Table which illustrates the kinds of errors that are identified and logged for each stage of the method of the present invention.

DETAILED DESCRIPTION OF THE PREFERRED EMBODIMENT

Turning first to the nomenclature of the specification, the detailed description which follows is represented largely in terms of symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures supplied by one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art. The steps of the method of the present invention generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Figure 1:
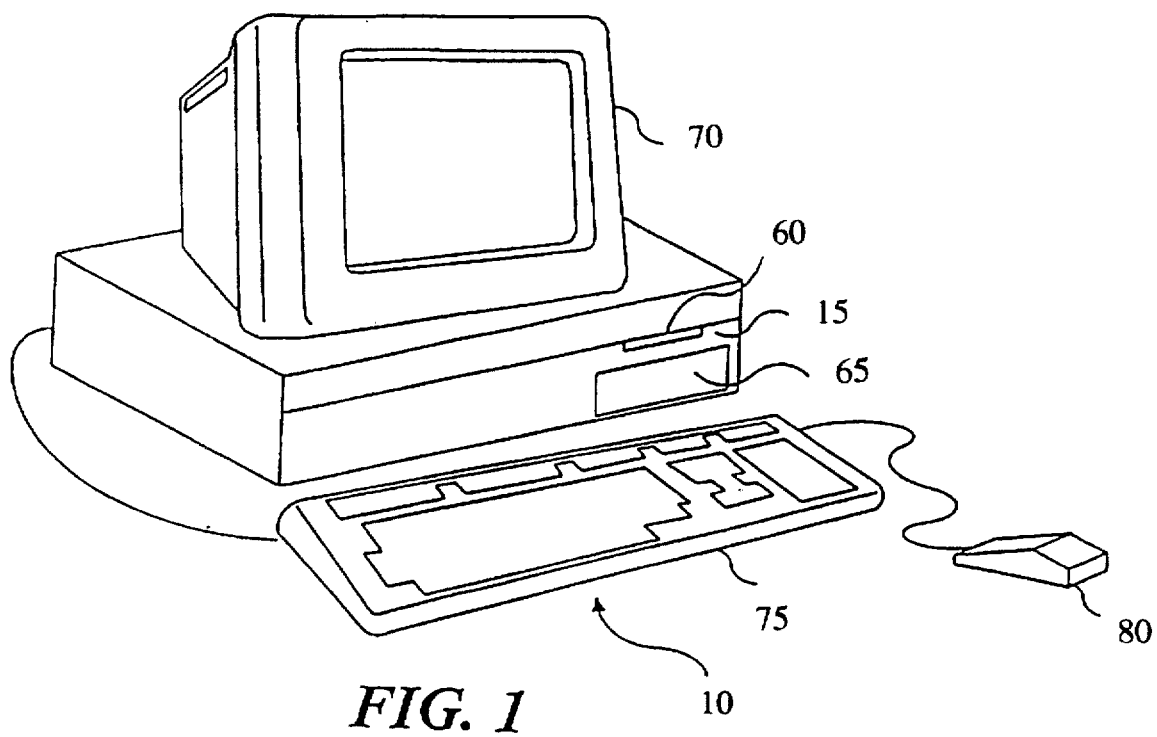
FIG. 1 is an illustration of a personal computer suitable for use in implementing the present invention.
Figure 2:
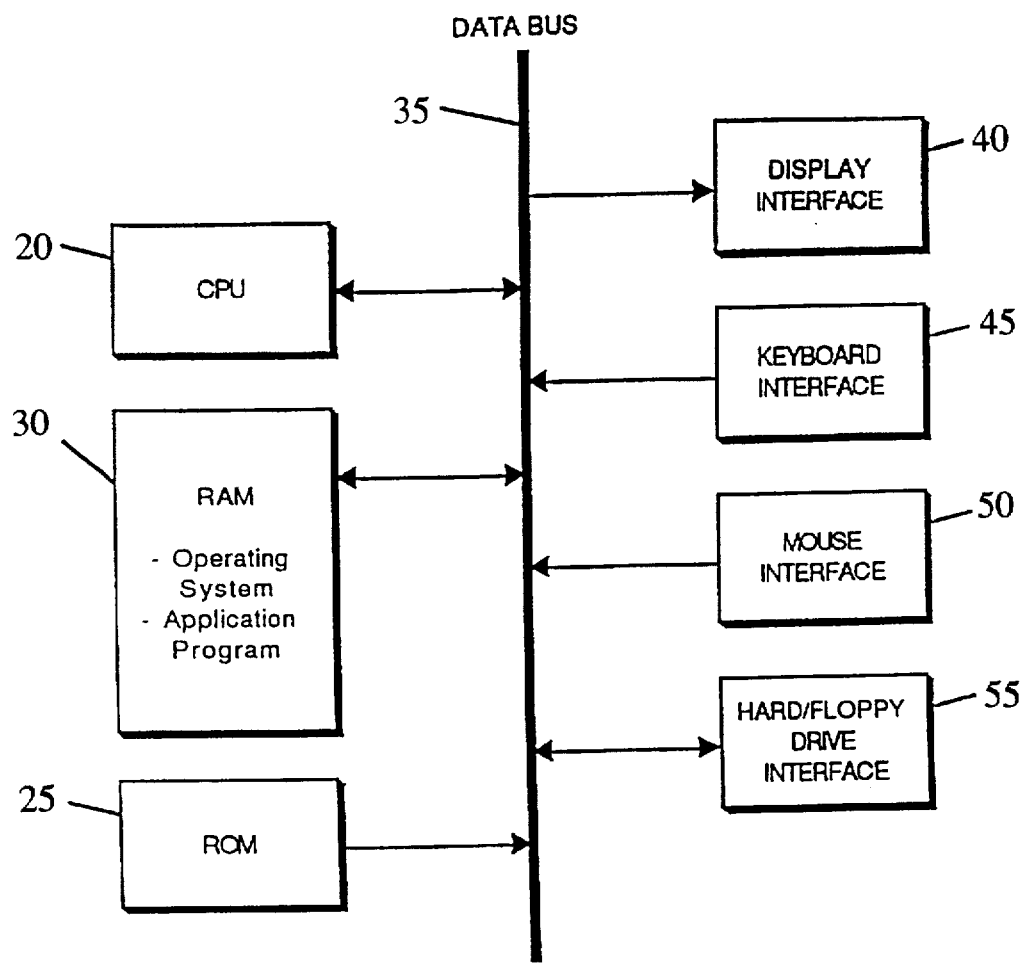
FIG. 2 is a block diagram showing the principle components of the processor chassis in a personal computer.
Figure 3:
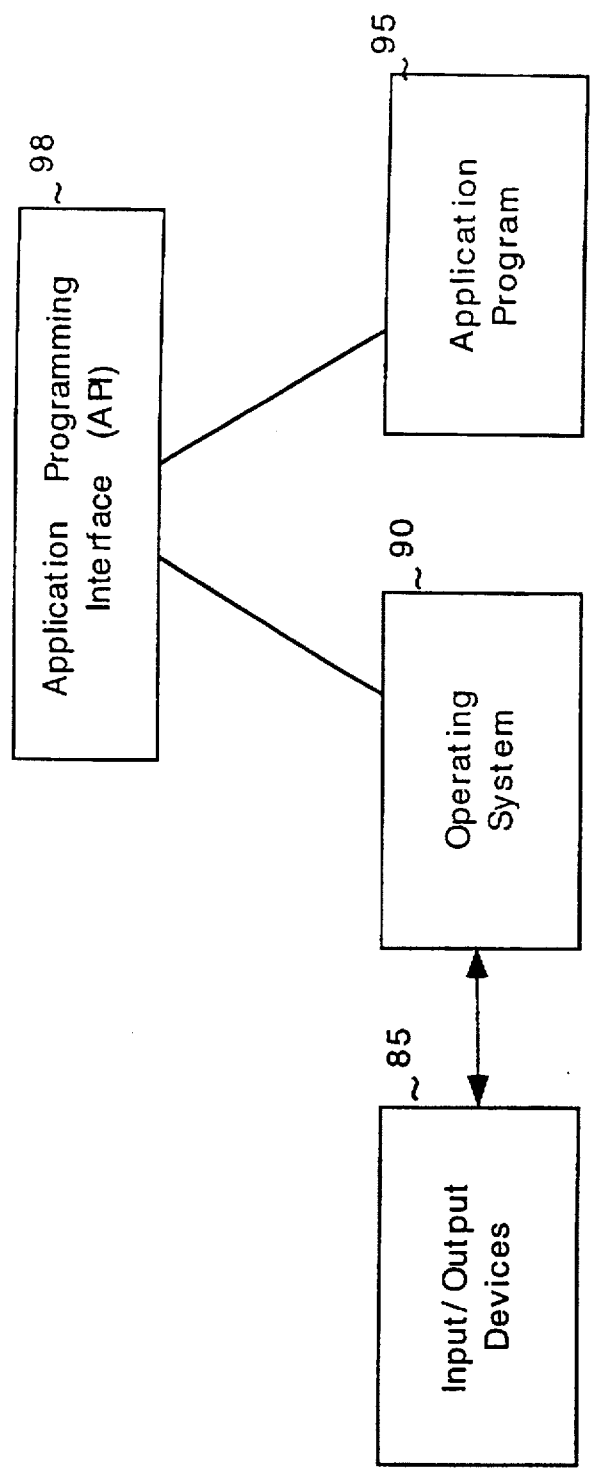
FIG. 3 Is a block diagram illustrating the application programming interface aiding communications between a computer's input/output devices, an operating system, and an application program.

FIGS. 1–3 illustrate various aspects of the computing environment in which the preferred embodiment of the present invention is designed to operate. Those skilled in the art will immediately appreciate that FIGS. 1–3, and the associated discussion, are intended to provide a brief, general description of the preferred computer hardware, operating system, and program interface, and that additional information is readily available in the appropriate programming manuals, user's guides, and similar publications.

FIGS. 1 and 2 illustrate a conventional personal computer 10 suitable for implementing the present invention. As shown in FIG. 1, the personal computer 10 includes a processor chassis 15, which houses a mother board and other printed circuit boards (not shown) of the type conventionally used in a personal computer.

The mother board, which is illustrated in the block diagram of FIG. 2, includes a central processing unit (CPU) 20, such as the 80486 or "PENTIUM" microprocessors manufactured by Intel. The mother board also includes read only memory (ROM) 25 and random access memory (RAM) 30, which are connected to the CPU by the data bus 35. Also connected to the CPU 20 via the data bus 35 are a display interface 40, keyboard interface 45, mouse interface 50, and a hard drive/floppy drive interface 55. Although many other internal components of the processor chassis 15 are not shown, those of ordinary skill in the art will appreciate that such components and the interconnection between them are well known. Accordingly, additional details concerning the internal construction of the personal computer 10 need not be disclosed in connection with the present invention.

Referring again to FIG. 1, the personal computer 10 includes a floppy drive 60 and a hard drive 65. The floppy drive 60 and the hard drive 65 are connected to the CPU 20 via the hard drive/floppy drive interface 55 and data bus 35 of FIG. 2 and are used for reading data from and writing data to magnetic media. The personal computer displays data of various types on a display 70. A user enters commands and information into the personal computer 10 by using a keyboard 75 and/or a pointing device such as a mouse 80. Other types of pointing devices include a track pad, track ball, or other device suitable for positioning a cursor on a computer display.

Those skilled in the art will understand that the operating system, application programs, and data are provided to the computer via one of its memory devices, which include the hard drive, floppy drive, RAM, and ROM. In the preferred computer 10, the hard drive 65 is used to store data and programs, including the operating system and the application programs. When the personal computer 10 is turned on or booted, it loads the operating system from the hard drive 65 into the RAM 30. Once the operating system is loaded into RAM, the CPU 20 executes the operating system code and causes the visual elements associated with the operating system to be displayed on the display 70. When the application program is executed by a user, the program code and relevant data are read from the hard drive 65 and stored in the RAM 30.

The preferred embodiment of the present invention is designed to operate with Microsoft Corporation's "WINDOWS" operating system. However, it should be understood that the invention can readily be implemented in any other operating system, such as IBM's "OS/2" operating system, DOS, and the operating system used in "MACINTOSH" computers manufactured by Apple Computer, Inc. The invention could also be readily implemented in a mainframe environment running the UNIX operating system or any other operating system.

The preferred embodiment of the present invention is also designed to operate with "WINDOWS" APIs written in the C++ programming language and with the C programming language. However, it should be understood that the invention can readily be implemented with program interfaces other than APIs, with program interfaces written in languages other than C++ such as the C programming language, and with languages other than C such as Visual Basic.

FIG. 3 is a simplified block diagram illustrating the interaction between the computer hardware 85, the operating system 90, an application program 95, and an application programming interface (API) 98. When the computer is turned on, the CPU 20 (FIG. 2) fetches instructions from the ROM 25. These instructions perform a power on self test and load the basic input output system (BIOS), which controls the most basic level of communications between the CPU and the peripheral devices. The CPU then loads the operating system into RAM and runs the operating system.

The operating system 90 (in conjunction with the BIOS and device drivers) provides the basic interface between the computer's resources, the user (input/output devices 85), and the application program 95. The operating system 90 interprets and carries out instructions issued by the user. For example, when the user wants to load an application program 95, the operating system 90 interprets the instruction (e.g., double clicking on the application program's icon) and causes the hard drive to load the program into RAM. Once the application program is loaded into RAM, the application program is executed by the CPU. In case of large programs, CPU loads various portions of the program into RAM as needed.

The operating system 90 also provides a variety of services that allow application programs to easily deal with various types of input/output (I/O), maintenance, and other needed services. These services are coded into program functions stored in APIs 98. APIs are program interfaces which contain a set of program functions that an application program uses to request and carry out lower-level services performed by the operating system. This allows an application program to issue relatively simple program function calls that cause the operating system to perform all of the steps required to accomplish various tasks. In the preferred embodiment, the program interface that is being tested for purposes of illustration is an API such as API 98. However, it should be understood that the invention can readily be implemented to test other program interfaces such as DLLs and other libraries.

Figure 4:
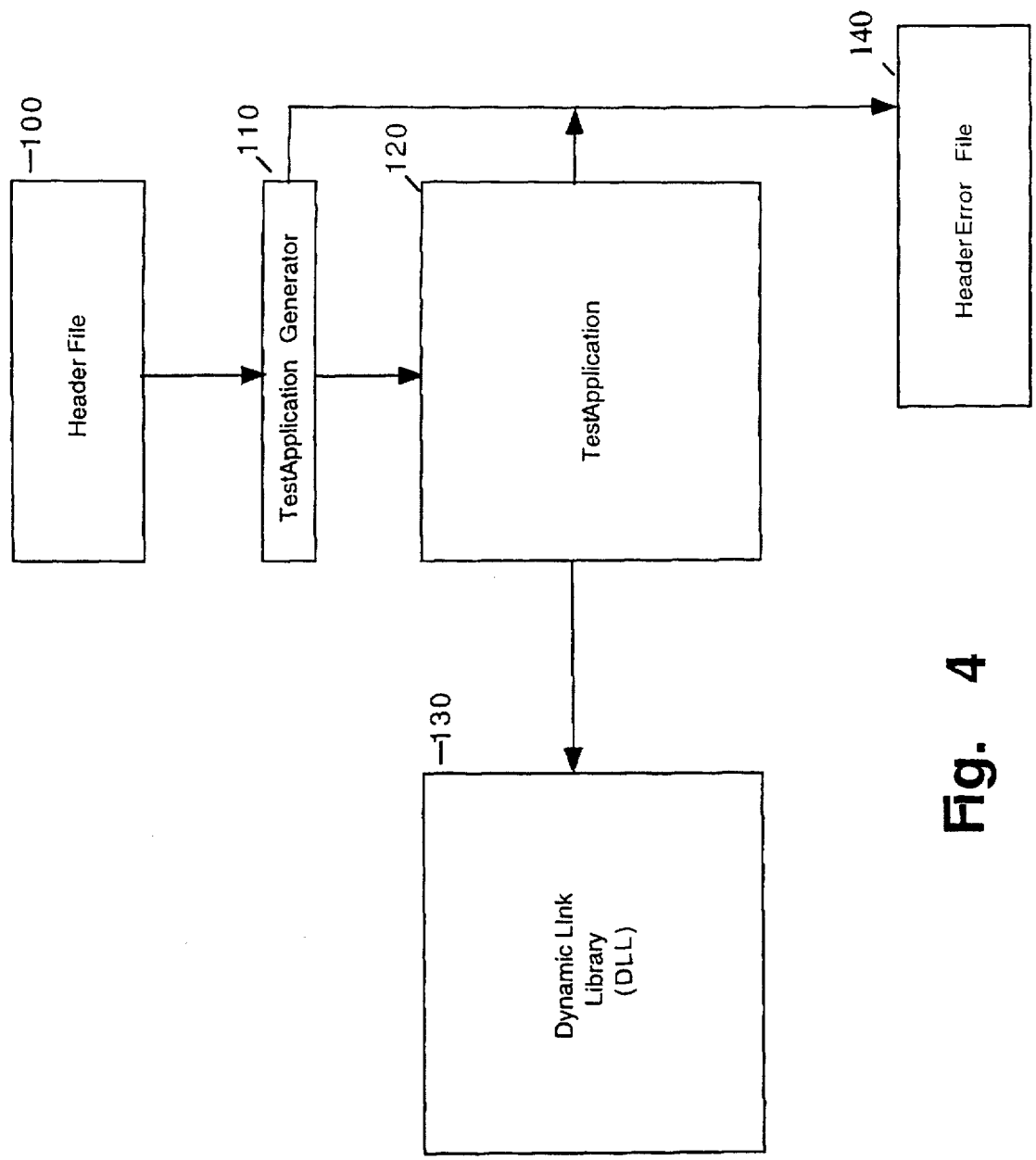
FIG. 4 is a block diagram illustrating the primary components of the present invention when a header file is tested for errors
Figure 5:
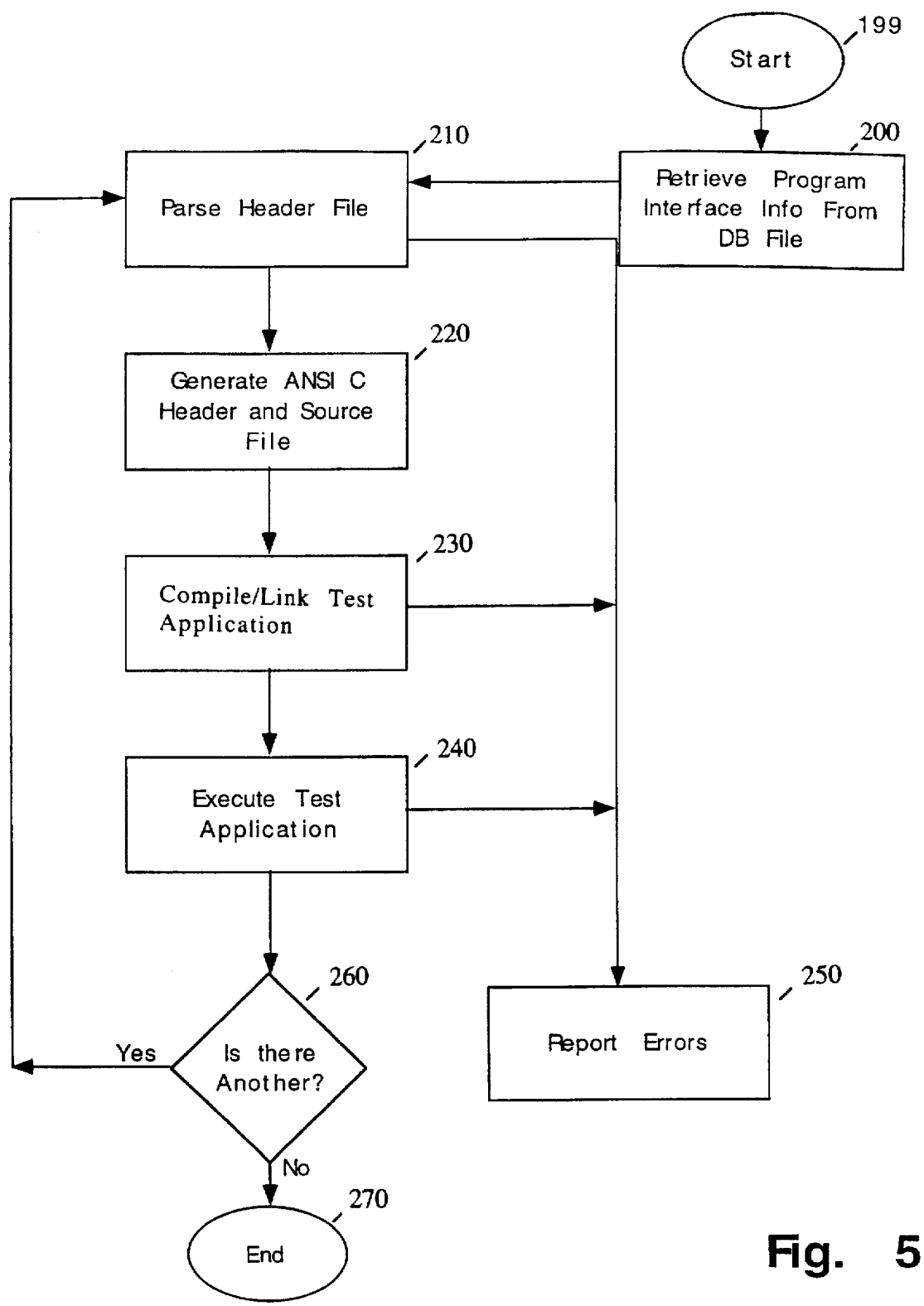
FIG. 5 is a flow diagram illustrating the method of the present invention when a header file is tested for errors.
Figure 6:
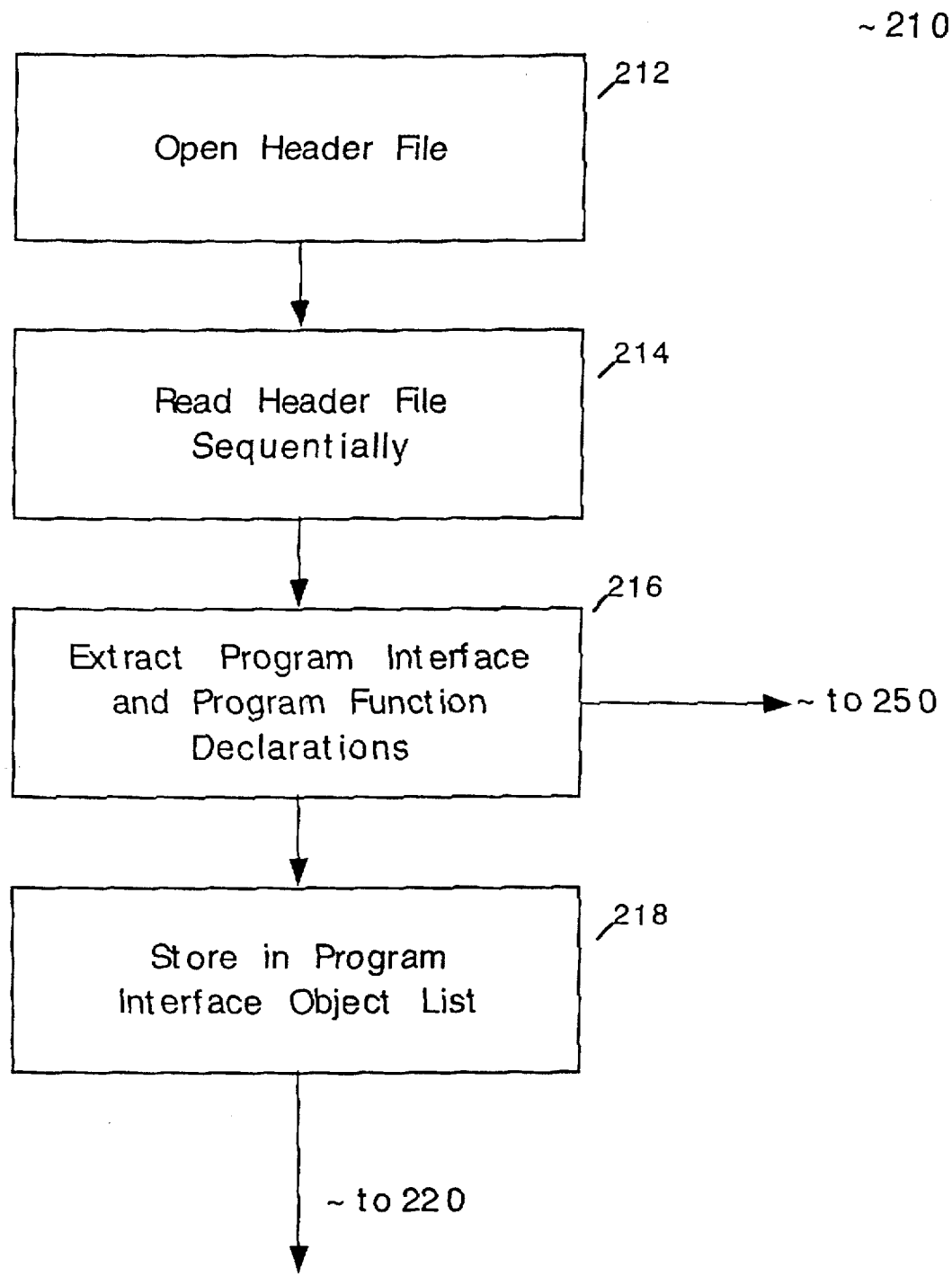
FIG. 6 is a flow diagram illustrating the method of parsing a header in the present invention.

Turning now to FIGS. 4–6, the embodiment of the present invention for testing a program interface for errors will be described. FIG. 4 is a block diagram illustrating the primary components used in connection with the method of the present invention and gives a general overview of the present invention. First, a header file 100 is opened by the test application generator 110. The test application generator 110 then uses information located within the header file 100, as will be explained in more detail below, to create a test application 120. The test application 120 is compiled, linked, and executed. Upon execution, the test application 120 makes program function calls to the DLL 13 which is a library of program functions that can be invoked by a proper call from an application program. The test application generator 110 and the test application 120 identify errors found within the header file 100, as will be explained in more detail below. The errors that are identified are stored in a header error file 140.

FIG. 5 is a flow diagram illustrating the steps of a preferred method for testing a program interface. The method starts at step 199 and proceeds to step 200. At step 200 program interface information is retrieved by opening and reading a database file. The database file contains the name and location of a header file 100 for the program interface that is to be tested, program interface keywords to be used in parsing, and the name and location of a header error file 140 in which to write the errors that are subsequently identified. In the preferred embodiment, the database file is a local INI file. However, those skilled in the art will understand that this can be done in alternative ways such as entering the program interface information from the command line or sending a batch file with multiple program interface information.

Table 1 below is an illustrative portion of the database file that might be opened and read at step 200. The contents of the database file retrieved will vary depending on the header file 100 that is to be tested. The information in Table 1 will be used to illustrate the methods of the present invention.

TABLE 1

Header=c:\dir1\dir2\file1.h
IFKeyword=DECLARE_INTERFACE
MethodKeyword=STDMETHOD;MSOMETHOD
THISKeyword=THIS
TargetDir=c:\dira\dirb
TargetFileRoot=TESTMSO
TargetCompilerKeyword=MSVC
TargetLanguage=C
LogFile=TESTLOG
MethodImpKeyword=STDMETHODIMP;MSOMETHODIMP For a particular interface to be tested, the illustrative database file (of step 200) contains the name of the program interface header file 100 that is to be tested (file1.h), program interface keyword information that is necessary for parsing, the name and location of the target directory where the generated test application 120 is to be stored (dirb), the name of the generated test application 120 (TESTMSO), and the name of the header error file 140 that will keep a record of any errors that are discovered (TEST.LOG).

After retrieving the program interface information at step 200, the method proceeds to step 210 (including substeps 212, 214, 216, and 218 of FIG. 6) where the header file 100 to be tested is parsed. In Table 1, the header file 100 to be tested is file1.h which is located at c:dir1dir2. The parsing of the header file 100 at step 210 depends on the program interface keyword information that is retrieved from the database file at step 200. Parsing of a file, such as header file 100, is well known to those skilled in the art, and there are numerous sources that can be referred to for a more detailed explanation of parsing. Therefore, in this invention, the parsing routine will be described in generalized terms.

The parsing step 210 for the header file 100 is broken down into substeps 212, 214, 216, and 218 shown in FIG. 6. Header file 100 is first opened at step 212 of FIG. 6. Table 2 contains sample code that may be found in a program interface header file 100, file.h, of Table 1.

TABLE 2

DECLARE_INTERFACE_(IOleControl,IUnknown)
{
    STDMETHOD(QueryInterface)(THIS_REFIID riid,
    LPVOID FAR* ppvObj) PURE;
};

Once the header file 100 is opened at step 212, it is read sequentially at step 214. As the header file 100 is read sequentially at step 214, program interface and program function declarations are extracted at step 216 using the program interface keywords retrieved from the database file at step 200. Errors in parsing are also identified at step 216 and transmitted to the header error file at step 250. The program interface and program function declarations are stored at step 218 in a program interface object list. From step 218, the method proceeds to step 220 in FIG. 5.

With continuing reference to FIG. 6, the keyword, DECLARE_INTERFACE in Table 1, indicates that a program interface is being read. So, at step 214 the header file 100, file.h, of Table 2, is read sequentially. When the word DECLARE_INTERFACE is read, that is a signal that the word following it is a program interface identifier. So in Table 2, the word following DECLARE_INTERFACE is a program interface identifier, IOleControl. This program interface identifier is extracted at step 216 and stored in a program interface object list at step 218.

In the preferred embodiment, a program interface object list contains a $C^{++}$ structure that stores the program function return type, program interface identifier, program function identifier, a program function parameter string, and an individual parameter list by type for each program function.

Table 3 illustrates the $C^{++}$ structure of an interface object list.

TABLE 3

```
struct structMethods
{
    returnType
    szInterface
    szMethod
    szParamString
    structParams;
}
struct structParams
{
    szParamName;
    nParamType;
}
```

The $C^{++}$ structure of Table 3 is necessary to create a program interface object list. Each element of the program interface object list is of the type structMethods of Table 3 and contains the program function return type, program interface identifier, program function identifier, and a program function parameter string for a single program function.

The header file 100 is read sequentially at step 214, and program interface and program function declarations are extracted at step 216 and stored at step 218 through a standard parsing method until the end of the file is reached. At this point the program interface object list has been created, and the program interface object list contains an object of type structMethods from Table 3 for each program function in the program interface.

For the present example, the program interface of Table 2 would be parsed, and a program interface object list with one object of type structMethods would be stored in a list. If there were more than one program function in the program interface, the list would contain an object for each program function. The object for the QueryInterface program function of Table 2 would have a returnType of void, a szInterface of IOleControl, a szMethod of QueryInterface, and a szParamString of "THIS_REFIID riid, LPVOID FAR* ppvObj". The szParamString is also parsed to separate individual parameters and types.

Referring back to FIG. 5, if any errors are identified while parsing the header file 100 at step 210 (substep 216), they are reported at step 250. In the present invention, errors are reported as they are identified. Errors are reported in step 250 by opening the header error file 140 and writing an error message to the header error file 140. The name of the header error file 140 is obtained from the database file at step 200. In the example of Table 1, the header error file 140 is TEST.LOG, and it is located in the target directory, Target-Dir. Errors in the header file 100 that would be identified while parsing at step 210 include identifying a missing parameter which expands to the implicit "this" pointer for non-$C^{++}$ compilers and which was not found in the header file 100 but should have been there.

Turning to FIG. 8, the Error Table illustrates two kinds of errors that are commonly identified and logged during the parsing stage of the method of the present invention. The parsing of the header file determines whether the implicit "this" pointer is missing. In addition, parsing the header file, either the public declaration file or the internal file, determines whether variable names are missing. While the presence of variable names is not required for a complete header file, naming variables in the header file is good practice, and missing variable names are logged as a warning to the programmer.

"This" pointers must be included in the program function declaration of a header file written in the $C^{++}$ programming language to enable a C application to access the $C^{++}$ virtual table for an object when calling a $C^{++}$ program function from a C application program. In $C^{++}$, a program function that is a member of a $C^{++}$ class can be referred to directly because a pointer to the object for which the member program function is invoked is a hidden argument to the program function. The hidden argument is referred to explicitly as "this". The "this" pointer enables the C application program to locate the memory addresses of the program functions that are members of the $C^{++}$ object by accessing the $C^{++}$ virtual table.

Figure 7:
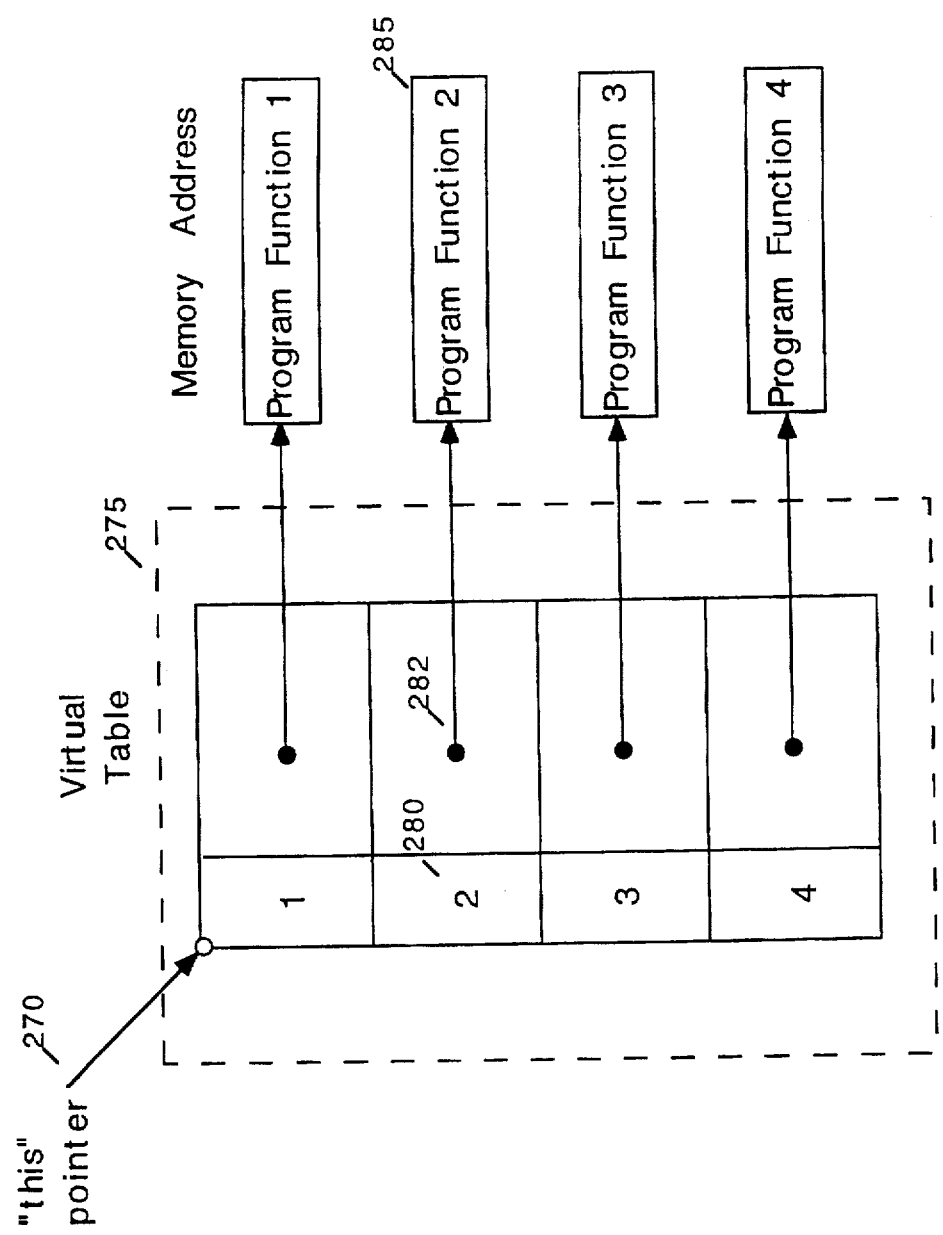
FIG. 7 is a block diagram illustrating a virtual table and showing how the "this" pointer operates.

Referring now to FIG. 7, the block diagram illustrates how the "this" pointer 270 is used to locate the memory addresses of the program functions that are members of the $C^{++}$ object. The "this" pointer 270 points to the virtual table 275 for the $C^{++}$ object. The virtual table 275 contains a pointer to the actual memory address of a member program function for each program function in the $C^{++}$ object. For example for program function 2, the virtual table 275 contains an identifier 280 and a pointer 282 to the address 285 in memory where the program function 2 is located. The other program functions 1, 3, and 4 are similarly found in memory using the "this" pointer 270 and the virtual table 275.

If the "this" pointer is missing in the program function declaration of a C++ header file 100, then a C application has no way of accessing the virtual table 275 of the C++ object containing the member program function. If the application program was written in the C++ programming language, the C++ compiler would have implicitly declared the "this" pointer, and it would have not been necessary to include the "this" pointer in the header file 100. The error would only have been detected when a C application program tried to make the program function call to the C++ member program function. The C++ header file must be written to include the "this" pointer so that a C application program can access the member program functions even though it is not necessary to enable a C++ application program to access the member program functions.

With reference to FIGS. 4-6, once the header file 100 (FIG. 4) is parsed at step 210 (FIG. 5), the errors that are identified during parsing are reported at step 250 to the header error file 140, and the program interface object list is created at step 218 (FIG. 6). The program interface object list is used at step 220 (FIG. 6) to generate a test application 120 (FIG. 4) consisting of an ANSI C header file and source file. Code generation, which would be used to generate test application 120 (FIG. 4), like parsing, is well known to those skilled in the art, and there are numerous sources that can be referred to for a more detailed explanation of code generation.

The method of the present invention parses the header file by first looping through the header file, reading line by line and searching for the text specified in the database as IFKeyword. Once found, the first argument inside parentheses is retrieved as the name of the interface and saved. The method of the present invention then searches for the opening bracket "{" in the header and reads each line looking for the MethodKeyword to denote a method declaration or until the closing bracket "}" is found. When a MethodKeyword is found, that line is broken apart, and an interface object is created. Pieces of this line are assigned to the StructMethod members of the interface object. The Interface name, which is saved above, is assigned to the new szInterface.

Using the declaration from Table 2, the STDMETHOD line is broken apart. First the method searches for the first opening parenthesis. The method then searches for a comma inside the parenthesis. If there is a comma inside the parenthesis, the first item past the comma is the method name, and the first item inside the parenthesis is the return-Type. If there is no comma inside the parenthesis, the item inside the parenthesis is the method name. Next the method skips past the closing parenthesis and finds the next opening parenthesis. The first string after the next opening parenthesis should be THIS or THIS_ macro. If the string is not THIS or THIS_ macro, log an error. If the string is THIS or THIS_ macro, skip past and assign the rest of the string, minus the closing parenthesis and PURE; to szParamString. Because this example doesn't have a return type, assign void to ReturnType. If the example had a return type, the return type would be between the first parameter inside the first parenthesis and before the method name.

The parameters are also stored in a list individually. These parameters are also parsed and broken down by type and variable name. This parsing is done by finding the first comma or the end of the list. This separates all space delimited text into the logical parameter. For each parameter, the text is searched for a number of specific words to describe type (THIS, FAR, CONST, etc.). Logic based on these findings is used to determine whether the text in question is a type descriptor or a variable name. After the parameter string is parsed, it is stored in the structParams structure and added to a dynamic sublist within the interface object list.

Once the entire interface object list is created, the test application is generated. This is done by first reading the description database (Table 1) to extract the targetfileroot entry. The targetfileroot entry is the root name of the test application. Next the targetlanguage entry is read. The targetlanguage entry will describe the language in which the test application is generated. This could be either C, C++, BASIC, or any other supported language. A blank file is then created with the name specified in targetfileroot and on an extension based on the language (ie: testapp.c). A standard header file is written, and then the method of the present invention will write a predefined standard test application to the file, substituting in values from the interface object list where appropriate. For instance, the generated header file code in Table 4 is created by looping through the interface object list and, in this case, substituting values from the IOleControl entry of the interface object list and placing them in pre-determined areas while writing to the target filename for the test header file. An example of the "template code" looks like this.

```
typedef struct_APP[szIFName]
{
    I[szIFName] p[szIFName];
    DWORD identifier;
} APP[szIFName];
void TestI[szIFName]( );
void InitI[szIFName]( );
#define [szMethodName] 1
STDMETHODIMP szMethodName]_func
    (I[szIFName] *p[szIFName], [szParamList]
```

In the preferred embodiment, the header file and source file generated at step 220 (FIG. 5) are coded in ANSI C so that they can be compiled by any C compiler. The test application 120 is generated to verify that the C++ program functions can be accessed from a test application 120 written in the C language. Briefly described, a test application 120 is generated that will issue program function calls to each and every program function in the program interface to verify that the program function can be correctly called and that the parameters are correct.

Table 4 will be used to illustrate the further operation of the program interface error identification method in accordance with the present invention. Table 4 contains sample code that would be found in the ANSI C application header file and source file generated at step 220 (FIG. 5) from the header file 100 (FIG. 4), file.h, of Table 2. In other words, Table 4 tabulates the results of step 220.

TABLE 4

```
Generated header file (TESTCTL.h):
    typedef struct_APPOLECONTROL
    {
        IOleControl pOleControl;
        DWORD identifier;
    } APPOLECONTROL;
    void TestIOleControl( );
    void InitIOleControl( );
    #define IOleControl_QueryInterface_ID 1
    STDMETHODIMP IOleControl_QueryInterface_func
        (IOleControl *pOleControl, REFIID riid, LPVOID FAR*
        ppvObj);
```

TABLE 4-continued

```
Generated source file:
    #define MSVC  // Target Compiler keyword from Table 1
        #include "C:\dir1\dir2\file.h"
        #include "TESTCTL.h"  // Carpenter generated header file
        #include <assert.h>
        #include <stdio.h>
        static IOleControlVtbl
        vOleControlVtbl;
        void main( )
    {
        TestIOleControl( );
    }
    void TestIOleControl( );
    {
        APPOLECONTROL testvar;
        InitIOleControl( );
        testvar.pOleControl.lpVtbl = &vOleControlVtbl:
        testvar.identifier = IOleControl_QueryInterface_ID;
        testvar.pOleControl.lpVtbl→QueryInterface(&
            (testvar.pOleControl), 0, 0);
    }
    void InitIOleControl( )
    {
        vOleControlVtbl.QueryInterface =
            IOleControl_QueryInterface_func;
    }
    STDMETHODIMP IOleControl_QueryInterface_func
        (IOleControl *pOleControl, REFIID riid, LPVOID FAR*
        ppvObj)
    {
        assert (IOleControl_QueryInterface_ID ==
            ((APPOLECONTROL*)pOleControl)→identifier);
        return(0);
    }
```

Once the ANSI C header and source file have been generated at step 220, the generated ANSI C header and source file are compiled at step 230 (FIG. 5) to create an executable test application 120 (FIG. 4). In the preferred embodiment of the invention, the header and source file are generated as ANSI C files. This is important because by generating an ANSI C header file and source file that can be compiled by any C compiler, it can be verified that the header file program functions can be called correctly by a C application program regardless of which compiler is used to compile the C application program. Step 230 can be repeated for each compiler that is to be tested. The ANSI C header and source file generated at step 220 can be compiled and linked by a plurality of compilers/linkers at step 230 to create a plurality of executable C test applications 120, and at each execution of step 230 for each compiler, the errors will be reported to the same header error file 140 at step 250. FIG. 8 illustrates the kinds of errors that are identified and logged during compiling and linking. Ordinary syntax errors in the public declaration header file and the internal header file are identified and logged. In addition, syntax differences between the public declaration header file and the internal header file that are unrelated to the virtual table are identified and logged.

At step 240, the executable test application 120 is executed. Referring back to the example in Table 4, the generated header file (from step 220) contains the definitions of data types and variables used by the program functions in the generated source file. The generated header file declares a structure that holds a pointer to the program interface implementation and an identifier. In Table 4, the pointer to the program interface implementation of IOleControl is pOleControl, and the identifier is of type DWORD. The generated header file also declares program function's TestI-OleControl and InitIOleControl both with a return type of void and no parameters. The generated header file defines IOleControl_QueryInterface_ID as having the value 1. The ID values are assigned to the program interface program functions by the position number of the program function in the program interface. The generated header file also declares a program function called IoleControl_QueryInterface with a return value of STDMETHODIMP (Table 1 keyword) and parameters that include the parameters of QueryInterface as defined in Table 2.

The generated source file (from step 220) of Table 4 makes a program function call in the main program function to TestIOleControl. TestIOleControl declares a variable testvar of type APPOLECONTROL which is the structure identified in the generated header file. Next TestIOleControl makes a program function call to InitIOleControl. Next the pointer to the program interface implementation of testvar is assigned. The identifier of testvar is assigned the value of the position of QueryInterface in the program interface which is 1 in this example. Finally, the interface method call is made.

The Error Table in FIG. 8 illustrates the errors that are identified and logged during execution of the test program. The execution of the test program detects the absence of the implicit "this" pointer. In addition, the execution of the test program detects a number of incompatibilities between the public declaration header file and the internal header file relating to the virtual table.

If there is another header file to test for errors at step 260 (FIG. 5), the method returns to step 210. If there is not another header file to test for errors at step 260, the method ends at step 270.

From the foregoing description, it will be appreciated that the present invention provides an efficient method for error identification in a program interface. The present invention has been described in relation to particular embodiments which are intended in all respects to be illustrative rather than restrictive. For example, although the present invention has been described in the context of generating a C test application to make program function calls to a C++ program function, those skilled in the art will understand that the principles of the present invention may be applied to, and embodied in, any programming languages which utilize libraries.

Alternative embodiments will become apparent to those skilled in the art to which the present invention pertains without departing from its spirit and scope. Accordingly, the scope of the present invention is defined by the appended claims rather than the foregoing description.

We claim:

1. A method for testing a program interface, comprising the steps of:

(a) retrieving a description of a header file;

(b) parsing the header file to create an interface object list;

(c) creating a test application using said interface object list;

(d) executing said test application;

(e) identifying any resulting error.

2. The method of claim 1, wherein the step of parsing a header file comprises:

(b) extracting a program function declaration from said header file using said description;

(c) creating an interface object list using said program function declaration.

3. The method of claim 2, further comprising the step of identifying any error discovered as a result of parsing said header file.

4. The method of claim 1, wherein the step of creating a test application comprises:

(a) generating source code using said interface object list;

(b) compiling and linking said source code.

5. The method of claim 4, further comprising the step of identifying any error discovered as a result of compiling and linking said source code.

6. The method of claim 1, wherein the step of executing said test application further comprises identifying any error discovered as a result of executing said test application.

7. A computer system for testing a program interface, comprising:

a central processing unit (CPU);

a memory coupled to said CPU;

said memory being operative to:
store a header file;
store a description of said header file;

said CPU being operative to:
retrieve said description of said header file from said memory;
parse said header file to create an interface object list;
create a test application using said interface object list;
execute said test application;
identify any resulting error.

8. The computer system of claim 7, wherein said CPU operation of parsing a header file comprises (a) extracting a program function declaration from said header file using said description;

(b) creating an interface object list using said program function declaration.

9. The computer system of claim 8, wherein said CPU operation of parsing a header file further comprises identifying any error discovered as a result of parsing said header file.

10. The computer system of claim 7, wherein said CPU operation of creating a test application comprises:

(a) generating source code using said interface object list;

(b) storing said source code in said memory;

(c) compiling said source code to create executable code;

(d) storing said executable code in said memory.

11. The computer system of claim 10, wherein said CPU operation of creating a test application further comprises identifying any error discovered as a result of compiling said source code.

12. The computer system of claim 7, wherein said CPU operation of executing said test application further comprises identifying any error discovered as a result of executing said test application.

13. A computer program, which when stored in computer memory tests a program interface, said computer program comprising:

computer-readable code for causing the computer to perform the steps of:

(a) retrieving a description of a header file;

(b) parsing the header file to create an interface object list;

(c) creating a test application using said interface object list;

(d) executing said test application;

(e) identifying any resulting error.

14. The computer program of claim 13, wherein said computer-readable code for causing the computer to perform the step of parsing a header file comprises:

(a) extracting a program function declaration from said header file using said description;

(b) creating an interface object list using said program function declaration.

15. The computer program of claim 14, wherein said computer-readable code for causing the computer to perform the step of parsing a header file further comprises identifying any error discovered as a result of parsing said header file.

16. The computer program of claim 13, wherein said computer-readable code for causing the computer to perform the step of creating a test application comprises:

(a) generating source code using said interface object list;

(b) compiling said source code.

17. The computer program of claim 16, wherein said computer-readable code for causing the computer to perform the step of creating a test application further comprises identifying any error discovered as a result of compiling said source code.

18. The computer program of claim 13, wherein said computer-readable code for causing the computer to perform the step of executing said test application further comprises identifying any error discovered as a result of executing said test application.

* * * * *